United States Patent
Corcoran, III

(10) Patent No.: US 7,116,005 B2
(45) Date of Patent: Oct. 3, 2006

(54) TIDAL/WAVE FLOW ELECTRICAL POWER GENERATION SYSTEM

(76) Inventor: James John Corcoran, III, 12258 N. 120th St., Scottsdale, AZ (US) 85259

( * ) Notice: Subject to any disclaimer, the term of this patent is extended or adjusted under 35 U.S.C. 154(b) by 57 days.

(21) Appl. No.: 11/059,157

(22) Filed: Feb. 16, 2005

(65) Prior Publication Data
US 2006/0181085 A1    Aug. 17, 2006

(51) Int. Cl.
*F03B 13/00*    (2006.01)
(52) U.S. Cl. .......................... 290/43; 290/54; 415/148; 415/1
(58) Field of Classification Search ............... 290/42, 290/43; 415/148, 1
See application file for complete search history.

(56) References Cited

U.S. PATENT DOCUMENTS

| | | | | |
|---|---|---|---|---|
| 3,986,787 A | * | 10/1976 | Mouton et al. | 415/7 |
| 4,102,599 A | * | 7/1978 | Ziegler | 415/221 |
| 4,120,602 A | * | 10/1978 | Megnint | 415/1 |
| 4,163,904 A | * | 8/1979 | Skendrovic | 290/54 |
| 4,468,153 A | * | 8/1984 | Gutierrez Atencio | 405/78 |
| 6,472,768 B1 | * | 10/2002 | Salls | 290/54 |
| 6,954,006 B1 | * | 10/2005 | Williams, Jr. | 290/54 |

* cited by examiner

*Primary Examiner*—Nicholas Ponomarenko

(57) ABSTRACT

An integrated system for tidal/wave flow electrical power generation. This bi-directional system utilizes the wave flow on the shores and the flow of various rivers and estuaries to generate electrical power through a venturi box which has mounted in it and comprises of the following components: a vane assembly with variable pitch vanes made from high impact blade material; a drive shaft assembly that connects the vane drive unit with the generator; a flow detection vane that determines velocity and direction thereby providing input to the flow detection controller and variable pitch computer and controller; a solid state voltage regulator; a mechanical fly wheel assist for the drive assembly during transition between flow direction; a grid cycle input device to match the power being generated with the grid. This system is capable of being coupled together both physically and electrically. The generator unit assembly is a field replaceable unit to ease installation and maintenance. The venturi box design mitigates slit and sand build-up. The vane radial design limits the damage by flotsam and provides a means of reducing fish damage as well.

2 Claims, 2 Drawing Sheets

TIDAL/WAVE FLOW ELECTRICAL POWER GENERATION SYSTEM
BLOCK DIAGRAM

TIDAL/WAVE FLOW ELECTRICAL POWER GENERATION SYSTEM

BACKGROUND OF THE INVENTION

This invention relates generally to the field of electrical power generation specifically to a system that generates power from tidal or wave motion. The virtually perpetual motion of the ocean waves and the tidal flows of rivers especially those classified as estuaries provide an endless source of energy that can be converted into electrical power.

The ability to cut back on dependence on oil and fossil fuel for power generation has long been a goal of the United States government and other global governments. Previously utilities or energy companies have utilized dams to create a water source to be run through generators for electrical power generation. This is extremely costly and limited to topographic areas where dams are adequately situated. Up until today, technology has not been available to provide a solid state generation capability or a variable pitch capability for turbine blades. With the advent of this capability, an application to use the shoreline tidal/wave action and the tidal action of our major rivers and estuaries in this country result in an untapped source of energy for electrical power generation. Additionally, turbine blade construction has been developed to provide an almost indestructible blade capable of providing the reliability that this device would require in the wave and river installation. The design of the spacing of the radial pattern would also mitigate damage from flotsam and reduce the fish kill probability.

Through the use of venturi designed concrete or other material flow devices and field removable/serviceable turbine and generator assemblies, this now can be a reality.

Proper placement of these systems along coastal areas would allow municipal governments to generate their own power. Placement in rivers especially those designated as major estuaries would provide local regions with power no matter what the time of year.

Variable geometry fan blades with flow direction and velocity detection and solid state power regulation and generation would provide a source of stable power for the continental and regional grids. In addition a solid state or mechanical fly wheel drive shaft would allow the unit to be used quickly in a bi-directional flow motion coupled with the ability to change the pitch of the vanes.

BRIEF SUMMARY OF THE INVENTION

One advantage of this invention is the ability to be serviced as one field unit.

Another advantage of this invention is to provide a source of energy that is constantly available without the use or dependency on fossil fuels of any kind.

A further advantage of this invention is to provide the capability to change the generation characteristics with the flow of the water through the use of variable vane technology and a flow, current and pitch computer controllers. The invention can be used where the flow is bi-directional without physically moving the unit. The ability to change the pitch of the vanes when the flow direction changes without losing generator output through the use of both a solid state voltage device and a mechanical fly wheel assembly on the drive shaft.

Yet another advantage of this invention is that it provides through the design of the venturi enclosure an added flow enhancement via the physical characteristics of the installation design.

A significant additional advantage is to provide a easily installed generation assembly for use by regional power companies to supplement the local grid requirements for power during all seasons and without concerns other than routine maintenance of the power generation assembly.

Other advantages and objects of the present invention will become apparent from the following descriptions, taken in conjunction with the accompanying drawings, wherein, by way of illustration and example, an embodiment of the present invention is disclosed.

In accordance with a preferred embodiment of the invention, there is disclosed; a totally integrated system comprised of components that generate electrical power through the use of tidal and wave flow. It also monitors the flow in order to produce a constant power generation by a flow direction and velocity detection system, a variable pitch vane computer and pitch motor controllers, a computer that monitors the grid cycle so as to synchronize the generation with the current grid cycle.

In accordance with a preferred embodiment of the invention, there is disclosed a process for tidal and wave flow electrical power generation. This process includes the physical determination of an installation where the tidal or wave flow is such that a constant water flow is available for use by the system. Piggy-back or parallel unit installation both physical and electrical is available for the user. The ability to lower into place and install the completed assembly from either a floating barge or land access crane is also part of the process. Access to a major power line is also part of the process of generation and installation. Once in place, the grid cycle signal is fed to the unit and the generated power is distributed in synch with the grid. The electrical current requirement controller maintains the power generation through the sending of signals to the variable pitch computer and controller which maintains the constant speed of the vane assembly that drives the generator. This is accomplished through the use of a solid state voltage regulation unit and a mechanical fly wheel assembly on the drive unit of the generator. These only are used when the unit is in transition between flow direction changes.

BRIEF DESCRIPTION OF THE DRAWINGS

The drawings constitute a part of this specification and include an exemplary embodiment of the invention, which may be embodied in various forms.

DETAILED DESCRIPTION OF THE PREFERRED EMBODIMENT

A detailed description of the preferred embodiment is provided herein. It is to be understood, however, that the present invention may be embodied in various forms. Therefore, specific details disclosed herein are not to be interpreted as limiting, but rather as a basis for the claims and as a representative basis for teaching one skilled in the art how to employ the present invention in an appropriately detailed system, structure or manner.

DETAILED DESCRIPTION OF THE INVENTION

The present invention provides a system, a method and a process for tidal/wave flow electrical power generation.

Figure 1:
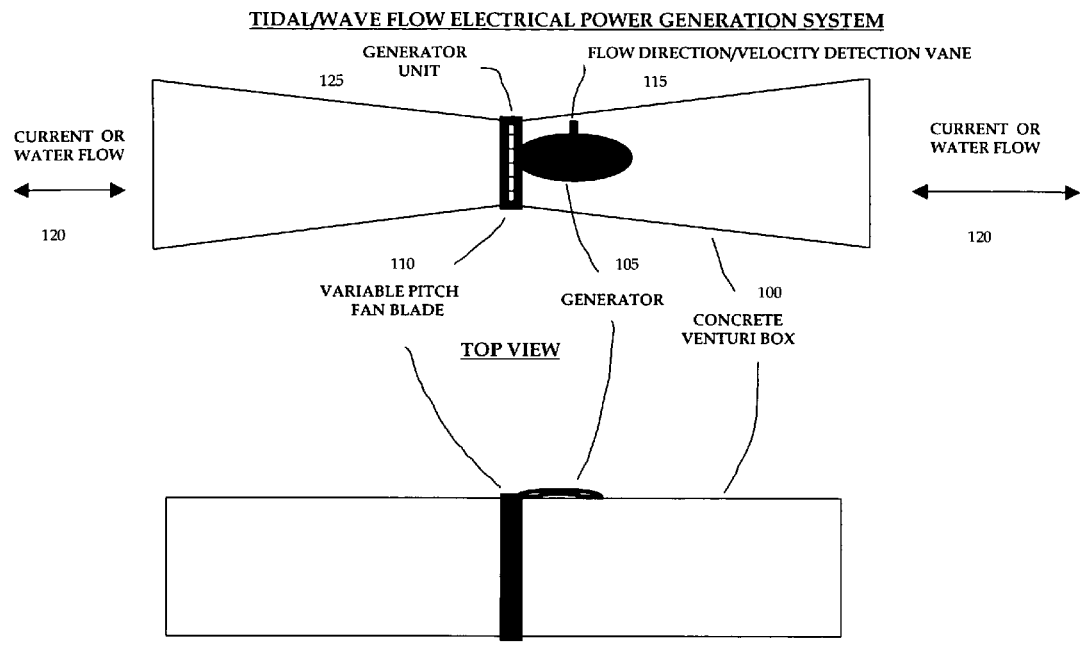
FIG. 1 is a pictorial diagram setting forth the various parts of the Tidal/Wave Electrical Power Generation System and the integration of the systems used in implementing the system.
Figure 1:
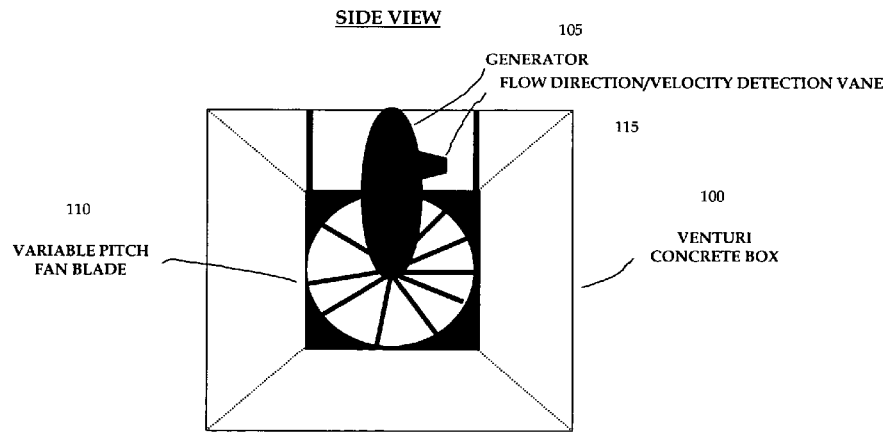
Figure 2:
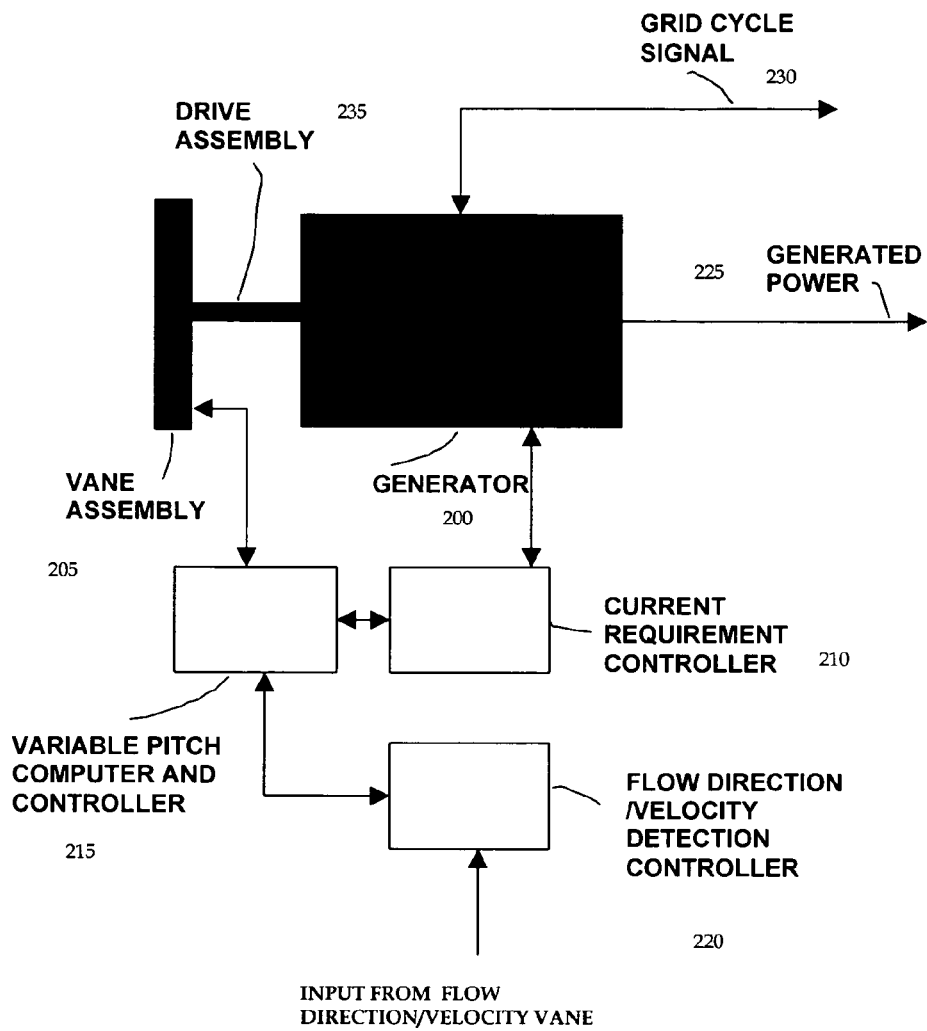
FIG. 2 is a block representation of the Tidal/Wave Flow Electrical Power Generation System illustrating the functions of the various parts of the system.

As illustrated in FIG. 1, the system generally includes a field replaceable generator unit 125, comprised of a variable pitch fan blade and vane motor control unit 110, a flow direction and velocity detection vane unit 115, a generator 105, all of which are located in the venturi concrete box unit 100. The water or current flows in and out of the venturi box at both ends of the concrete box unit 120. The venturi box may be three or four sided depending on the installation requirements and flow history of the intended installation site. The venturi box is constructed in such a manner as to provide ample mitigation of slit and sand build-up in the unit. The venturi box is not limited to be constructed of concrete. Steel or other substantial material may be used to create the unit. The field replaceable unit 125 is easily lifted from the venturi box unit for service. As illustrated in FIG. 2, located with the generator unit 200 is the current requirement controller 210 that monitors the grid cycle signal 230 and provides input to the variable pitch computer and controller 215. These units, in conjunction with the flow direction and velocity detection controller 220, provide the optimum pitch requirements for the vanes 205 so that the most constant drive 235 of the generator is provided to the system 225. The generator has a solid state voltage regulation unit and the drive assembly is assisted by a mechanical fly wheel during the transition between changes in flow direction.

As an overview, the tidal/wave flow electrical power generation system, FIG. 1, generates electrical power in synchronization with the grid cycle and provides a constant power source based on the current being detected by the flow direction and velocity detection vane 115 and the vane pitch requirements being computed by the current requirements controller 210.

The system includes a automatic drop-off function if the unit cannot keep synchronization with the grid or maintain a constant power generation with the water flow being presented to the unit through the venturi box.

Although the invention is discussed in terms of a electrical power generation system that utilizes tidal and wave flow, this system can be used wherever a flow of any kind can be utilized to provide the movement of the vanes and drive the generator to provide electrical power.

Although described herein as being separate systems or components, as would be understood by a person skilled in the art, conceptual components described herein of these and other systems may be combined in the same equipment or may be part of other systems or equipment unrelated to the present invention.

In the foregoing specification, the invention has been described with reference to specific exemplary embodiments. However, one of ordinary skill in the art appreciates that various modifications and changes can be made without departing from the scope of the present invention as set forth in the claims below. Accordingly, the specification and figures are to be regarded in an illustrative rather than a restrictive sense and all such modifications are intended to be included within the scope of the present invention.

In addition, benefits, other advantages, and solutions to problems, and any element(s) what may cause any benefit, advantage, or solution to occur or become more pronounced are not to be construed as critical, required, or essential feature or element of any or all the claims. As used herein, the terms "comprises," "Comprising," or any other variation thereof are intended to cover non-exclusive inclusion, such that a process, method, article, or apparatus that comprises a list of elements does not include only those elements but may include other elements not expressly listed or inherent to such process, method, article, or apparatus.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An integrated tidal/wave water flow bi-directional electrical power generation system, said system comprising:
   a generator unit assembly and a controls for electrical power generation,
   a venturi box that provides a mounting area for the generator unit and mitigates slit and sand build-up and enhances the flow through the design,
   a variable pitch vane blade assembly with a vane pitch controller that provides a rotating source of drive for the generator,
   a means for water flow detection through the vane assembly that senses direction, velocity and provides signals to the vane pitch controller,
   a means for providing a grid cycle signal in order to keep the electrical power being generated by the generator unit with the same characteristics of the grid,
   a means for coordinating the electrical current requirements and for providing communication with the vane controller,
   a means for providing a signal to the vane controller pitch motors to change the pitch of the blades in concert with the electrical current requirements and the water flow input/output to the venturi box, wherein
   the electrical power generation unit assembly can be field replaced and serviced as one unit.

2. An integrated tidal/wave water flow bi-directional electrical power generation system as claimed in claim 1, wherein said current requirement controller provides synchronization of said generator with the grid.

* * * * *